US006380129B1

(12) United States Patent
Kraemer

(10) Patent No.: US 6,380,129 B1
(45) Date of Patent: Apr. 30, 2002

(54) ENHANCED MATERIALS FOR TREATMENT OF CONTAMINATION

(76) Inventor: Richard J. Kraemer, 5717 Arapahoe Rd., Boulder, CO (US) 80303

(*) Notice: Subject to any disclaimer, the term of this patent is extended or adjusted under 35 U.S.C. 154(b) by 0 days.

(21) Appl. No.: 09/432,863

(22) Filed: Nov. 2, 1999

(51) Int. Cl.$^{7}$ .......................... B01J 20/02; B01J 20/10; B01J 20/22

(52) U.S. Cl. ...................... 502/400; 502/407; 502/414; 210/924

(58) Field of Search ............................. 502/20, 29, 31, 502/400, 407, 410, 414; 134/6, 7; 210/922, 924, 925

(56) References Cited

U.S. PATENT DOCUMENTS

| | | | | |
|---|---|---|---|---|
| 3,619,264 | A | * | 11/1971 | Worms et al. |
| 3,676,357 | A | | 7/1972 | Ciuti et al. |
| 4,083,716 | A | * | 4/1978 | Yoshida |
| 4,148,941 | A | * | 4/1979 | Pape et al. |
| 4,212,755 | A | * | 7/1980 | Ruff et al. |
| 4,241,138 | A | * | 12/1980 | Chentemirov et al. |
| 4,255,489 | A | * | 3/1981 | Nielsen |
| 5,035,804 | A | | 7/1991 | Stowe |
| 5,496,570 | A | * | 3/1996 | Mauss et al. |

FOREIGN PATENT DOCUMENTS

| | | | | |
|---|---|---|---|---|
| DE | 1542756 | A | * | 10/1970 |

* cited by examiner

*Primary Examiner*—Steven P. Griffin
*Assistant Examiner*—Christina Ildebrando
(74) *Attorney, Agent, or Firm*—Webb & Lewis LLC; Glenn L. Webb

(57) ABSTRACT

An enhanced material formed from a carrier material having a high porosity. The carrier material is treated with a mixture of hydrocarbons to increase the adherence of the carrier material particles to one another to minimize atmospheric contamination of the carrier materials in use. The material has particular applicable to environments where such contamination would create problems, such as food processing and preparation environments, computer operations, electronic component manufacturing and other environments. The material meets the requirements of FDA regulations for Indirect Food Contact.

5 Claims, No Drawings

ENHANCED MATERIALS FOR TREATMENT OF CONTAMINATION

FIELD OF THE INVENTION

This invention relates to the field of materials for treating liquid spills.

BACKGROUND OF THE INVENTION

A problem that is of great environmental concern is the treatment of liquid spills. This is of particular concern when the spill involves harmful, toxic and/or hazardous materials. Such spills must be quickly contained to prevent or minimize the leaching of these materials into the ground and into groundwater supplies. The containment and movement of such liquid spills can be quite costly in the event that the liquid spills must be moved to a Liquid Disposal Site which are typically inaccessible to most sites. The effectiveness of the treatment includes the efficiency, the rate of the treatment and the ability to dispose of the saturated materials used for treatment.

A critical factor in treating such liquid spills is the speed in which the treatment occurs. The longer period of time that elapses while the spill (or aqueous solution) is being cleaned increases the opportunity for the liquid to leach into the surrounding surfaces or to contaminate the environment.

Another problem with such spills is the disposal of the treatment material once the material is fully saturated or the spill has been treated. Most of the prior materials are organic in nature and will often interact with the particular solution being treated. This interaction may cause the contaminate to be re-released back into the environment.

A number of materials are presently utilized in such instances with varying degrees of success. One type of material often used previously has a clay base. This type of material has previously been used for treating oil spills as well as for kitty litter. However these clay-based materials do not work well for many types of spills, they adsorb rather than absorb and tend to deteriorate upon adsorption.

Another popular type of treatment material is cellulose-based, usually in the form of pellets. These materials may be treated to improve absorption but again, are organic based, biodegradable and do not work well for many materials. The contaminates are released back into the environment once these materials begin to degrade.

One prior art attempt at treating water surface pollution is disclosed in U.S. Pat. No. 3,676,357, issued to Ciluti, et al. This patent discloses a composition having a floating carrier, a surface active agent and a wetting agent. This composition is in powder form and is intended for use only in thin laminar oil and gas pollution of bodies of water.

Another prior art attempt is disclosed in U.S. Pat. No. 5,035,804, issued to Stowe. This patent discloses a composition of a fine grained particulate material coated with an oleophilic/hydrophobic layer formed of sulfur, metallic sulfate, an alkali metal nitrate and burned hydrocarbon oil. This material is burned and then used to treat oil spills.

The prior materials used to treat spills are either in powder or pellet form. These materials do not "bond" or stick together when dispersed. Thus, when the materials are released, particularly from an elevated position, onto the liquid or solid surface, the materials become airborne and fail to be accurately placed.

This is particularly a problem in environments where small atmospheric particles may contaminate the surrounding environment. For example, enclosed areas such as food processing, food preparation, pharmaceutical manufacturing, computer rooms, printed circuit/wafer manufacturing, and any other enclosed environment where contamination or other interference of airborne particles is of critical concern.

Presently, there are few if any contamination treatment materials that meet the requirements of the United States Food and Drug Administration regulations for use in food preparation and processing environments, including environments where meat, poultry and seafood are collected, processed, packaged and sold. Additionally, few if any liquid spill treatment materials are allowed for use in pharmaceutical manufacturing environments for fear of indirect contamination.

Another area where dispersal of airborne contaminates is of concern includes outdoor environments, such as nuclear or radioactive waste containment and disposal. The lighter weight, non-sticky, particles become easily airborne and subject to wind forces. Not only is the containment of such particles, particularly after the particles have been saturated with a hazardous product, of concern, but their susceptibility to wind forces render them less effective in placement. This reduces their effectiveness as well as raising the costs of treating the spill.

Thus a critical need exists for materials that can quickly and efficiently treat liquid spills for disposal, including liquids having particulates dissolved therein. There is a particular need for materials that can be effectively used without creating atmospheric contamination. There is also a need for materials that can be accurately and efficiently dispersed. There is a further need for materials that can be used under the regulations of the Food and Drug Administration for food preparation and processing environments, pharmaceutical manufacturing and in environments where meat, poultry and seafood are collected, processed, packaged and sold.

SUMMARY OF THE INVENTION

The present invention accomplishes those needs by providing an enhanced material capable of quickly, effectively and efficiently treating a variety of liquid spills. In a preferred embodiment of the present invention, the enhanced material uses an inorganic material having specific properties of size and saturability. The material is then treated to increase the adherence of the particles with one another to reduce airborne contamination during dispersal and clean up operations.

In one preferred embodiment, the material includes expanded perlite. This materials has a high porosity due to irregularities formed in the particulates, such as microcavities, voids and cracks. In the preferred embodiment, the expanded perlite, amorphous alumina silicate, is used only as particles within a particular range of specifications. In this preferred embodiment, the perlite particles are controlled within specific parameters, having a size range of approximately $297\mu$ to $1019\mu$ and having saturability properties of between approximately 4.5 liters/Kg to 10.3 liters/Kg. It is to be expressly understood that these ranges are approximate in nature, with expansion on either side of the range to achieve the desired saturation properties of the particles as discussed herein. These properties provide optimum dispersal and saturation properties for treating liquid spills when treated with a petroleum distillate solution, as discussed herein.

In the preferred embodiment, the perlite particles having the size and saturation properties discussed above are treated with a petroleum distillate solution having specific properties as discussed in the detailed description of the preferred embodiments. The petroleum distillate solution is a mixture of non-combustible liquid petroleum hydrocarbons. In the preferred embodiment, the petroleum distillate solution predominantly includes saturated hydrocarbons with some branched, straight chained or saturated cyclic structures. The selected perlite particles are treated with the special mixture of petroleum distillate solution to increase the adherence of the particles together. The selected perlite particles which have been thus treated provide an effective material which can be used without fear of airborne contamination of the surrounding environment and can be effectively and efficiently dispersed on a liquid or surface area to be treated. The treated product will convert the liquid into a moist or semi-dry solid which can be disposed in a Solid Waste Disposal Site rather than the more costly and inaccessible Liquid Waste Disposal Sites.

These and other features of the claimed invention will be evident form the ensuing detailed description of preferred embodiments.

DETAILED DESCRIPTION OF PREFERRED EMBODIMENTS

Preferred embodiments of the present invention are described herein. It is to be expressly understood that these exemplary embodiments are provided for descriptive purposes only and is not meant to unduly limit the scope of the present inventive concept. Other embodiments, and variations of the material of the present invention are considered within the present inventive concept as set forth of the claims herein. It is to be expressly understood that other variations are contemplated for use with the present invention as well.

Carrier

The material of the present invention utilizes a carrier which is capable of being saturated several times it's weight in liquid. In the preferred embodiment of the present invention, the carrier is formed from perlite, amorphous alumina silicate. Perlite typically is a naturally occurring siliceous volcanic rock. When particles of perlite are quickly heated to above sixteen hundred degrees Fahrenheit, it expands by creating myriad micro-cavities and cracks within the particles and on the surfaces of the cavities. These expanded perlite particles are characterized by low density and high porosity. This high porosity allows the particles to absorb relatively large amounts of water by capillary action into the voids (cracks and micro-cavities) of the particles. In the. preferred embodiment of the present invention, the size of the perlite particles is critical. In the present invention, it has been determined that the saturability of the particles is size dependent. Particles falling on either side of the stated size restrictions, 297$\mu$ to 10191$\mu$, saturate at lower capacity than is optimum for the present invention.

Another important feature of the perlite particles is their inorganic composition. The particles are chemically inert and will not interact with the liquid spills in which they are utilized. Thus, the liquid spill, particularly toxic or hazardous materials, will be retained until such time as they can be disposed without the danger of the particles suffering significant deterioration ion which might release the materials back into the environment.

In the preferred embodiment, the expanded perlite particles are selected to be within a specific range of properties. In the preferred embodiment, the expanded perlite particles are selected to be within a range of approximately 297$\mu$ to 1019$\mu$. It is to be expressly understood that this range can be expanded as understood by one skilled in the art to achieve the desired characteristics of saturability without airborne dispersal. The selected expanded perlite particles also have a saturability of water range of between approximately 4.5 liters/Kg to about 10.3 liters/Kg. Again, it is to be expressly understood that this range can be expanded as understood by one skilled in the art to achieve the desired characteristics of saturability without airborne dispersal. These selected expanded perlite particles are preferred with use with the special mixture of hydrocarbons, discussed in detail below, which provide increased adherence of the particles to one another.

For explanatory purposes, the carrier described in the preferred embodiment is expanded perlite, particularly of the size and saturability range discussed above. However other materials, preferably inorganic, having irregularities, such as cracks, micro-cavities and voids may be used as well. These materials are able to absorb aqueous solutions by the capillary action of those irregularities as well as by surface tension on their surfaces.

Material Treatment

In the preferred embodiment, the expanded perlite particles, having the size and saturability (about 297$\mu$ to about 1019$\mu$ and about 4.5 liters/Kg to about 10.3 liters/Kg) properties discussed above, are treated with a special mixture of hydrocarbons to increase the adherence of the particles to one another. In the preferred embodiment the selected perlite particles are treated with a petroleum distillate solution, although it is to be understood that other mixtures can be used that provide equivalent properties. The petroleum distillate solution of the preferred embodiment include a mixture of non-combustible liquid petroleum hydrocarbons.

This petroleum distillate solution predominantly includes saturated hydrocarbons with some branched, straight chained or saturated cyclic structures. The exact mixture can be adjusted by one skilled in the art to achieve the desired property of providing optimum adherence of the selected perlite particles. The petroleum distillate solution includes the range of the Specifications, Physical and Chemical properties detailed in the ranges of Table 1. It is to be expressly understood that this range can be expanded as understood by one skilled in the art to achieve the desired characteristics of increasing the adherence of the perlite particles without adversely affecting the absorbality of the particles.

TABLE 1

| Properties | Minimum Range | Maximum Range |
|---|---|---|
| Flash Point | 200° Fahrenheit | |
| API Gravity, 60° F. | 31/33 | 46/50 |
| Specific Gravity@25° F. | .77 | .88 |
| Flash Point, ASTM D 97° F. | 220 | 385 |
| Viscosity, SUS@100° F. | 31.4 | 100 |
| Pour Point, ASTM D 97° F. | −40 | +10 |
| Color, Say-Food Grade | +30 | UV |
| Absorbance CFR(178.3620 B) | Pass | |
| Hydrocarbon Type, ASTM D 1319 | | |
| Aromatics, % | .5 | 2.0 |
| Olefins, % | nil | nil |
| Saturates, % | 98.0 | 99.5 |

The selected expanded perlite particles are treated with the specified petroleum distillate solution as discussed in detail below.

Manufacture

In the preferred embodiment, the selected expanded perlite particles meeting the specifications of size and saturability are collected in a mixing tank. For example, the selected perlite particles are placed in a 500 to 750 gallon tank. The particles are then slowly mixed at room temperature, ~68° F. The specified Petroleum Distillate Solution, discussed above, is then added to the mixing tank at the rate of about five (5) liters per minute. The Petroleum Distillate Solution is added until the mixture is about 3.0% to 6.2% Petroleum Distillate Solution weight per volume. The solution is then allowed to stand for about one (1) hour. The treated particles are then packaged for storage until their use is desired.

In use, the finished product will be accurately and easily dispersed onto the liquid or solid surface to be treated. The treated particles adhere to one another to create a compact mass of particles that can easily be dispersed within the confines of the area to be treated without fear of atmospheric dispersal outside those confines, even in outdoor environments subject to wind forces. The treated particle will, upon contact with a liquid, convert the liquid into a moist or semi-dry solid. This conversion renders liquids eligible for disposal into Solid Waste Disposal Sites which are less costly and more accessible than Liquid Waste Disposal sites.

It is to be expressly understood that other variations of the present invention are included within the scope of the inventive concept as claimed.

I claim:

1. A material for cleaning up liquid spills, said material comprises:

carrier particles having a characteristic of high saturability;

said carrier particles treated with a solution to increase the adherence of said carrier particles to one another; and said solution includes:

a mixture of liquid petroleum hydrocarbons having the following properties within the approximate ranges:

| Properties | Minimum Range | Maximum Range |
| --- | --- | --- |
| Flash Point | 200° Fahrenheit | |
| API Gravity, 60° F. | 31/33 | 46/50 |
| Specific Gravity@25° F. | .77 | .88 |
| Flash Point, ASTM D 97° F. | 220 | 385 |
| Viscosity, SUS@100° F. | 31.4 | 100 |
| Pour Point, ASTM D 97° F. | −40 | +10 |
| Color, Say.-Food Grade | +30 | UV |
| Absorbance CFR(178.3620 B) | Pass | |
| Hydrocarbon Type, ASTM D 1319 | | |
| Aromatics, % | .5 | 2.0 |
| Olefins, % | nil | nil |
| Saturates, % | 98.0 | 99.5 |

2. A material for cleaning up liquid spills, said material comprises:

carrier particles formed of expanded perlite having a size from about 297μ to about 1019μ and saturability properties from about 4.5 liters/Kg to about 10.3 liters/Kg;

said carrier particles treated with a solution to increase the adherence of said carrier particles to one another; and said solution having properties ranging as specified:

| Properties | Minimum Range | Maximum Range |
| --- | --- | --- |
| Flash Point | 200° Fahrenheit | |
| API Gravity, 60° F. | 31/33 | 46/50 |
| Specific Gravity@25° F. | .77 | .88 |
| Flash Point, ASTM D 97° F. | 220 | 385 |
| Viscosity, SUS@100° F. | 31.4 | 100 |
| Pour Point, ASTM D 97° F. | −40 | +10 |
| Color, Say.-Food Grade | +30 | UV |
| Absorbance CFR(178.3620 B) | Pass | |
| Hydrocarbon Type, ASTM D 1319 | | |
| Aromatics, % | .5 | 2.0 |
| Olefins, % | nil | nil |
| Saturates, % | 98.0 | 99.5 |

3. A material for treating liquid spills, wherein said material includes:

carrier particles formed of expanded perlite having a size from about 297μ to about 10191μ and saturability properties from about 4.5 liters/Kg to about 10.3 liters/Kg; and said carrier particles treated with a solution to increase the adherence of said carrier particles to one another, said solution having properties ranging as specified:

| Properties | Minimum Range | Maximum Range |
| --- | --- | --- |
| Flash Point | 200° Fahrenheit | |
| API Gravity, 60° F. | 31/33 | 46/50 |
| Specific Gravity@25° F. | .77 | .88 |
| Flash Point, ASTM D 97° F. | 220 | 385 |
| Viscosity, SUS@100° F. | 31.4 | 100 |
| Pour Point, ASTM D 97° F. | −40 | +10 |
| Color, Say.-Food Grade | +30 | UV |
| Absorbance CFR(178.3620 B) | Pass | |
| Hydrocarbon Type, ASTM D 1319 | | |
| Aromatics, % | .5 | 2.0 |
| Olefins, % | nil | nil |
| Saturates, % | 98.0 | 99.5 |

4. A method for preparing a composition for treating contaminated liquids, said method comprising the steps of:

providing selected carrier particles having a high porosity of a desired size and saturability;

providing a solution of a mixture of predominantly saturated hydrocarbons with some branched, straight chained or saturated cyclic structures in a solution, wherein said solution having properties in the range of:

| Properties | Minimum Range | Maximum Range |
| --- | --- | --- |
| Flash Point | 200° Fahrenheit | |
| API Gravity, 60° F. | 31/33 | 46/50 |
| Specific Gravity@25° F. | .77 | .88 |
| Flash Point, ASTM D 97° F. | 220 | 385 |
| Viscosity, SUS@100° F. | 31.4 | 100 |
| Pour Point, ASTM D 97° F. | −40 | +10 |
| Color, Say.-Food Grade | +30 | UV |
| Absorbance CFR(178.3620 B) | Pass | |
| Hydrocarbon Type, ASTM D 1319 | | |
| Aromatics, % | .5 | 2.0 |
| Olefins, % | nil | nil |
| Saturates, % | 98.0 | 99.5 |

;and treating said selected carrier particles with said solution to increase the adherence of said selected carrier particles to one another.

5. A method for preparing a composition for treating contaminated liquids, said method comprising the steps of:

providing carrier particles as expanded perlite particles having a size between about 297µ to about 1019µ and saturability characteristics of about 4.5 liters/Kg to about 10.3 liters/Kg; and providing a solution as a mixture of liquid petroleum hydrocarbons having properties in the range of about:

| Properties | Minimum Range | Maximum Range |
|---|---|---|
| Flash Point | 200° Fahrenheit | |
| API Gravity, 60° F. | 31/33 | 46/50 |
| Specific Gravity@25° F. | .77 | .88 |
| Flash Point, ASTM D 97° F. | 220 | 385 |
| Viscosity, SUS@100° F. | 31.4 | 100 |
| Pour Point, ASTM D 97° F. | −40 | +10 |
| Color, Say.-Food Grade | +30 | UV |
| Absorbance CFR(178.3620 B) | Pass | |

| Properties | Minimum Range | Maximum Range |
|---|---|---|
| Hydrocarbon Type, ASTM D 1319 | | |
| Aromatics, % | .5 | 2.0 |
| Olefins, % | nil | nil |
| Saturates, % | 98.0 | 99.5 | collecting said carrier particles in a vessel;

mixing said carrier particles in said vessel;

adding said solution to said carrier particles in said vessel at a rate of about five liters per minute until the mixture is about 3.0% to 6.2% weight per volume of said solution; and allowing said mixture to stand for about one hour to increase the adherence of said selected carrier particles to one another.

* * * * *